Feb. 28, 1939.  J. E. DAVEY  2,149,241
SAW HANDLE AND BLADE
Filed Oct. 26, 1936
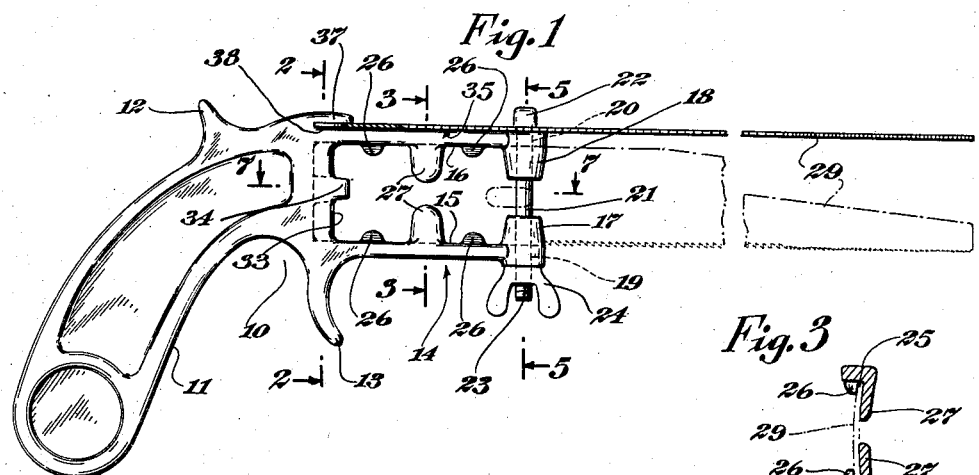
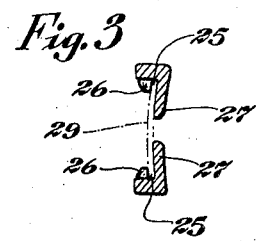
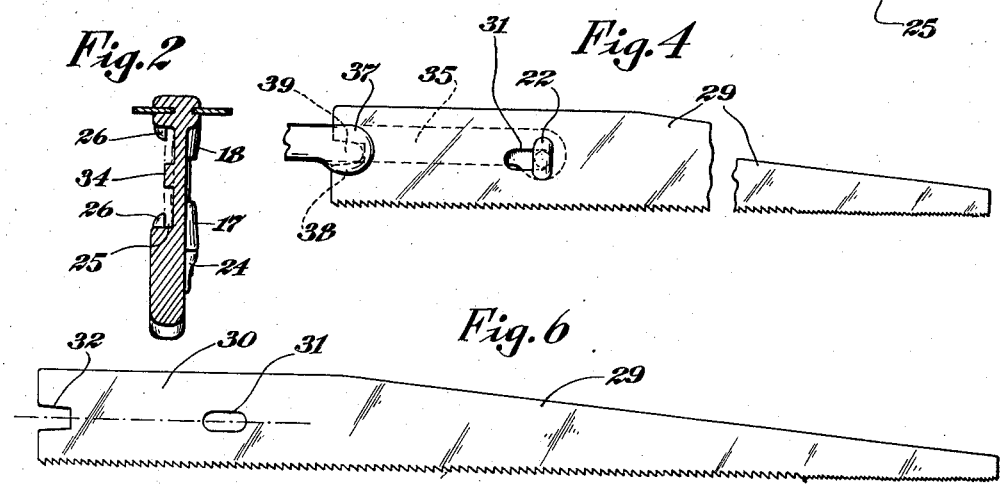
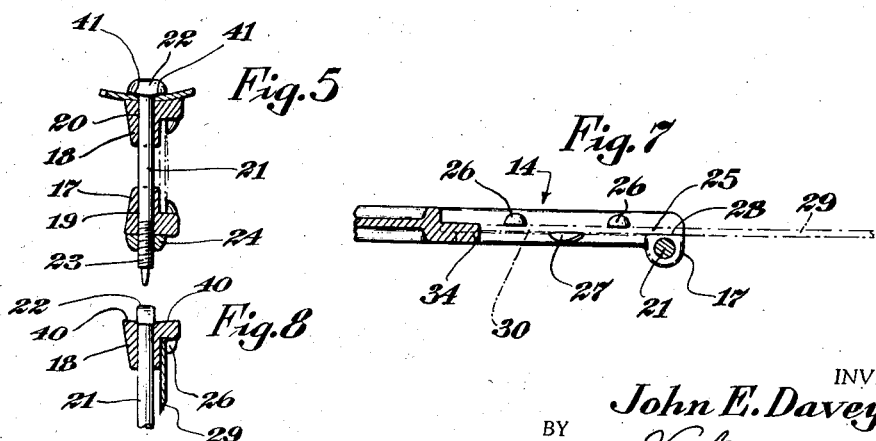
INVENTOR,
John E. Davey,
BY
HIS ATTORNEY.

Patented Feb. 28, 1939

2,149,241

UNITED STATES PATENT OFFICE 2,149,241

SAW HANDLE AND BLADE

John E. Davey, New York, N. Y., assignor to Rose Gringer, New York, N. Y.

Application October 26, 1936, Serial No. 107,542

3 Claims. (Cl. 145—108)

This invention relates to saw handles and blades therefor; more particularly, to blade holding devices having general utility where it may be found desirable to hold such a member in a plurality of positions.

It is contemplated by my invention to provide a blade holding device, more particularly, a saw handle of simple and inexpensive construction wherein facile interchange of the holding means and the blade may be effected, yet efficiently and securely positioning these members in relation to each other for their intended purpose.

It is further contemplated as an object of my invention to provide a saw handle having a readily separable blade, especially for holding a scroll saw type of blade, wherein adequate rigidity and effective connection between the saw handle and blade are provided.

Still more particularly, it is an object of my invention to provide a saw handle particularly suitable for holding a scroll saw blade in which the saw blade may be affixed in a plurality of positions in relation to the handle.

A still further object of my invention resides in providing a saw handle in which a saw blade may be positioned in a variety of positions in respect to the most comfortable position for manipulating the saw handle and wherein a plurality of forms of saw blades may be used in convenient association therewith.

Still further objects of my invention reside in the provision of a saw handle and blade therefor in which affixation of the blade to the saw handle may be accomplished quickly and facilely and in a variety of positions in respect of the handle for comfortably and conveniently functioning for its intended use, all embodied in an exceedingly simple and inexpensive construction.

To attain these objects and such further objects as may appear herein or be hereinafter pointed out, I make reference to the accompanying drawing forming a part herein, in which Figure 1 is a plan view of my saw handle and blade;

Figure 2 is a section taken on a line 2—2 of Figure 1;

Figure 3 is a section taken on the line 3—3 of Figure 1;

Figure 4 is a fragmentary top elevation;

Figure 5 is a section taken on the line 5—5 of Figure 1;

Figure 6 is a plan view of a blade;

Figure 7 is a section taken on the line 7—7 of Figure 1;

Figure 8 is a fragmentary section similar to Figure 5, with the T-head of the bolt longitudinally disposed.

Making reference to the drawing, I have illustrated a saw handle 10 comprising a hand holding section 11, including a palm stop 12 and finger grip 13, particularly suitable for providing a hand gripping portion of compact nature, readily fitting within the palm of the hand, yet giving facility of control for various sawing operations, particularly scroll work.

The forward portion of the saw handle is provided with a blade clamping portion 14, having features which will be more apparent as this description proceeds.

Preferably the saw handle is of integral construction and is made from a drop forging to give toughness with a certain degree of resiliency, though it will be understood that castable metals may otherwise be employed.

The clamping portion is a bifurcated extension of the handle and comprises extensions 15 and 16, terminating in lugs 17 and 18, through which orifices 19 and 20 are formed in alignment to receive the bolt 21, having at one end a T-shaped head 22, and at its opposite end a thread portion 23, to which may be applied a wing nut 24.

The branches 15 and 16 are faced therebetween with a rectangular seat 25. To either side of such seat there are provided lugs 26 and medial tongues 27. The spacing between the lugs 26 and tongues 27 corresponds substantially to the thickness of the saw hereinafter described.

The lugs 17 and 18 may likewise be flattened at the inner faces 28, thereby to present this flattened portion in alignment with the inner face of the tongues 27.

With a construction as thus far described, a saw blade 29, having a rectangular rear portion 30 may be associated with the clamping member of the saw handle. The rectangular portion 30 of the saw blade may be disposed within the seat 25 so that the inner face of each of the lugs 26 is disposed to one face of the saw blade and the inner face of each of the tongues 27 and the flattened portion 28 of the lugs 17 and 18 is disposed to the opposite face of the saw blade.

Tensioning of the sections 15 and 16 towards each other, through the medium of the wing nut 24, will securely bind the saw blade in working position.

In Figure 6, where I have illustrated the saw blade 29, I have referred to a generally rectangular portion 30. When so constructed, this may be utilized in connection with the blade clamping means 14, thus far described, without special modification.

Where the saw blade is made of thin sheeted material, including a substantial degree of flexibility if unsupported, an accidental canting during sawing operations may snap and break the saw, particularly near the edge of the blade clamping portion. Accordingly, in order to stiffen the blade and distribute the stiffness away from the edge of the blade clamping portion, I may transversely flex the blade, employing certion of the features described in my Patent No. 2,017,895, October 22, 1935. This I may accomplish by inwardly directing the tongues 27 in the plane of the seat 25, as will be more clearly apparent from an inspection of Figure 3. The tensioning of the wing nut 24 thereby flexes the blade clamped therebetween in a gentle curve which is distributed throughout the length of the blade, imparting stiffness to the blade.

For further accentuating the transverse flexibility, imparting stiffness to the blade, and for other purposes which will be apparent as this description proceeds, I provide the portion 30 of the blade with an elongated orifice 31, and a notched portion 32. This orifice 31 and the notched portion 32 sufficiently weaken the blade to facilitate the flexing action just described. The elongated orifice 31 and the notched portion 32 additionally introduce other elements of novelty hereinafter to be described.

Where a saw blade of the character illustrated in Figure 6 is employed, with the blade clamping means or saw handle, I may include adjacent the rear wall 33 a tongue 34 corresponding substantially to the notched portion 32. The tongue 34 also serves to center the blade vertically where the spacing between the branches 15 and 16 is greater than the width of the blade adjacent the rectangular section 30 so that full advantage may be obtained of the flexing action of the sections 15 and 16, when tensioning the wing nut 24, thus compensating the variability in the width of the rectangular portion of the blade while permitting adequate clamping action.

It will be understood that the blade 29 may be inserted in the seat 25 in the position shown in dotted lines in Figure 1 or in the reverse position. Where, however, it is desired to position the blade for scroll work or to operate in confined spaces or corners, a transverse positioning of the blade in respect to the saw handle is desirable as in the position illustrated in connection with Figures 1 and 2. For this purpose, the section 16 is provided with an upper flattened seat 35, upon which the blade 29, at its rectangular portion 30, may lie. To affix the blade in this transverse position, the wing nut 24 may be released to permit the T-shaped head 22 to lie transversely of the plane running through the saw handle and its shape is calculated to correspond to the elongated orifice 31 of the saw blade.

In line with the upper seat 35 and rearwardly thereof, there is provided a lug 37, slotted at 38 to receive the thickness of the saw blade. Extending into the slotted portion is a tongue 39, corresponding in contour to the notched portion 32. It is preferred that the seated portion 35 be provided with a concave surface 40, as will be more readily apparent from an inspection of Figure 8.

The T-shaped head 22 may, at its inner face 41, be convexly contoured.

With a transverse seat 35 as provided, and upon release of the bolt 21 to project the T-shaped head for a small distance upwardly, a blade such as illustrated in Figure 6 may be affixed to be transversely seated. This may be accomplished by passing the T-shaped head 22 through the elongated orifice 31, with the T-shaped head 22 positioned transversely, as illustrated in Figures 1, 4 and 5. The blade is then given a rotary movement around the bolt 31, advanced and then retracted until the heel of the rectangular section 30 enters the slot 38, with the notched portion 32 engaging the tongue 39. In this position, the wing nut 24 may be tensioned, firmly seating the blade in position.

It will be understood that by reason of the concave transverse section 40 and the corresponding convex curvature 41 of the T-shaped head 42, the blade may, as previously described, be transversely flexed to impart the desired stiffness.

Thus, it will be observed that engagement of the heel of the blade and the tongue 39 provides the resistance against displacement in the forward stroke of the blade, in use, and that the tensioning of the wing nut 24 against the blade frictionally holds the blade against displacement in the rearward stroke of the saw in use. The frictional action is augmented by the transverse flexing of the blade, in addition to the stiffening action which this transverse flexing otherwise provides for the blade.

It will thus be observed that I have described novel and simple clamping means for a saw blade, in addition to embodying simplicity and economy of construction and in which variable positioning of the blade in respect of the saw handle may be obtained.

It will also be observed that I have provided a saw blade which cooperates with the clamping means described, serving not only as means for quickly and efficiently attaching the blade into clamping position but additionally facilitates flexing to provide stiffening in the direction of the stresses applied during the sawing operation, of particular value in connection with thin sectioned blades where scroll work is to be executed.

In general, it will be observed that I have provided a novel and efficient saw handle and blade therefor, of simple and economical construction, in which variability of positioning of the blade in respect to the saw handle may be quickly and facilely accomplished and in which blades having different contours and tolerance in size may be utilized.

Having thus described my invention and illustrated its use, that I claim as new and desire to secure by Letters Patent, is

1. In a device of the character described comprising, in combination, a saw blade including an attachable heel and saw teeth extending throughout the length thereof, a handle therefor including a clamping portion for the heel comprising an open ended seat formed on extensions integrally formed with said handle and a tension member extending parallel to the plane of the blade for binding the blade on the seat comprising a headed bolt, an exterior seat formed on one of said extensions for transversely mounting said blade thereon, said bolt being extended through the plane of said exterior seat and engaging the blade positioned thereon for mounting the same transversely to the handle.

2. In a device of the character described comprising, in combination, a saw blade including an attachable heel provided with an elongated perforated portion, a handle therefor including a clamping portion for the heel of said blade comprising longitudinally spaced and grooved branches forming an open ended seat into which said blade is slidably insertible, an exterior seat on one face of one of said branches forming the clamping portion for said blade, a slotted lug adjacent one end of said exterior seat arranged to receive one end of said blade, a tension member rotatably mounted in and passing through said branches, said member including a T-headed portion adapted to pass through the perforated portion on said blade and upon transverse rotation to the elongated perforated portion binding said blade transversely to the handle, said tension member forming a common binding means to both of the positions which said blade may assume upon seating, either on the open ended seat or the exterior seat.

3. In a device of the character described comprising, in combination, a saw blade including an attachable heel provided with perforated portions substantially medially longtudinally thereof forming a weakened portion facilitating flexing in such direction, a handle therefor including a clamping portion for the heel of said blade comprising spaced branches grooved longitudinally and defining an open ended seat, an exterior seat on one face of said branches having a portion thereof concavely formed, a slotted lug adjacent one end of said exterior seat to receive one end of said blade, a tension member common to both of said seats connecting said branches and having a T-head extending in the plane of said exterior seat and capable of locking said blade through one of said perforated portions on said blade, said tension member being disposed to longitudinally flex the blade to stiffen the same when held upon either of the seats aforesaid.

JOHN E. DAVEY.